United States Patent [19]

Takahashi et al.

[11] Patent Number: 5,258,167
[45] Date of Patent: Nov. 2, 1993

[54] EXTRACTANT FOR RARE EARTH METAL AND METHOD FOR EXTRACTING THE SAME

[75] Inventors: Toshio Takahashi, Yokohama; Hiroaki Nishizawa, Fujisawa; Yukari Ishii, Tokyo, all of Japan

[73] Assignee: Lion Corporation, Tokyo, Japan

[21] Appl. No.: 708,363

[22] Filed: May 31, 1991

[30] Foreign Application Priority Data

Jun. 1, 1990 [JP] Japan ................................. 2-144021
Jun. 1, 1990 [JP] Japan ................................. 2-144022

[51] Int. Cl.$^5$ ............................................. C01F 17/00
[52] U.S. Cl. .......................... 423/21.5; 423/DIG. 14; 210/634; 75/710
[58] Field of Search ............ 423/21.1, DIG. 14, 21.5; 210/634; 75/710

[56] References Cited

U.S. PATENT DOCUMENTS

| | | | |
|---|---|---|---|
| 3,575,687 | 4/1971 | Drobnick | 423/21.5 |
| 4,201,747 | 5/1980 | Minagawa et al. | 423/21.5 |
| 4,461,748 | 7/1984 | Sabot et al. | 423/10 |
| 4,548,790 | 10/1985 | Horwitz et al. | 423/9 |
| 4,741,893 | 5/1988 | Watanabe et al. | 423/471 |
| 4,927,609 | 5/1990 | Leveque et al. | 423/21.5 |
| 4,964,997 | 10/1990 | Leveque et al. | 210/634 |

FOREIGN PATENT DOCUMENTS 0156735 10/1985 European Pat. Off.
55-134141 10/1980 Japan.
58-84118 5/1983 Japan.
1-96014 4/1989 Japan.

*Primary Examiner*—David Brunsman
*Attorney, Agent, or Firm*—Burns, Doane, Swecker & Mathis

[57] ABSTRACT

An extractant for extracting rare earth metal ions comprises, for instance, di-(3-methylcyclohexyl)phosphoric acid, di-1-ethylpentylphosphoric acid, docosyl-(2 isopropyl-5-methylcyclohexyl) phosphoric acid, 2-ethylhexyl-2-methylcyclohexylphosphoric acid and/or 2-hexyloctyl-cyclohexylphosphoric acid or a combination of, for instance, dicyclohexylphosphoric acid and di-(2-heptylundecyl) phosphoric acid. A method for extracting rare earth metals comprises the step of bringing an acidic aqueous solution containing ions of rare earth metals into contact with an extraction medium containing an extractant exemplified above to transfer the rare earth metal ions to the extraction medium. The extractant not only exhibits high extractability for rare earth metal ions but also facilitates the back extraction of the rare earth metal ions therefrom. In particular, the extractant has a great difference between the extractabilities for light rare earth metals which are abundantly present in the crust of the earth and for medium and heavy rare earth metals and has an excellent power for mutual separation of these rare earth metals. Thus, the rare earth metal ions can be extracted and separated in high efficiency.

7 Claims, No Drawings

EXTRACTANT FOR RARE EARTH METAL AND METHOD FOR EXTRACTING THE SAME

BACKGROUND OF THE INVENTION

The present invention relates to an extractant for a rare earth metal and a method for extracting the same. Incidentally, the term "rare earth metal" is herein defined to encompass fifteen elements from lanthanum (atomic number: 57) to lutetium (atomic number: 71), scandium (atomic number: 21) and yttrium (atomic number: 39).

Since the rare earth metals have properties similar to one another, the rare earth metals covering from light rare metals such as lanthanum, cerium to middle and/or heavy rare earth metals such as lutetium are widely present, as a mixture, in, for instance, raw ores such as monazite and bastnaesite and thus they can only be separated into each element with great difficulties.

As methods for separating these rare earth metals into each individual element, there have presently been adopted, for instance, a method in which an ion-exchange resin is used and a method which makes use of extraction with a solvent.

Among these methods, the solvent extraction method comprises the step of bringing an acidic aqueous solution containing rare earth metals into contact with an organic solvent containing an extractant to thus selectively extract ions of a specific rare earth metal from the aqueous solution into the organic solvent. As the extractants conventionally used for such solvent extraction of ions of rare earth metals, there has been known, for instance, di-(2-ethylhexyl) phosphoric acid as disclosed in Japanese Unexamined Patent Publications (hereinafter referred to as "J. P. KOKAI") No. Sho 50-36316. This di-(2-ethylhexyl)phosphoric acid has a high extraction capacity against the ions of rare earth metals and is an excellent extractant for use in the separation and purification of the rare earth metals.

However, di-(2-ethylhexyl)phosphoric acid can maintain a high extraction capacity even in the low pH region and, therefore, the use thereof involves great difficulties in back-extracting the ions of rare earth metals extracted by di-(2-ethylhexyl)phosphoric acid into a water phase. For this reason, the use of a concentrated acid is required for the back extraction of the rare earth metal ions into the water phase. In particular, this tendency becomes more conspicuous when extracting heavy rare earth metals among others which have a high distribution factor for the phase of the extraction medium and they still remain in the phase of the extraction medium even if a large amount of an acid is employed for the back extraction. Therefore, they become a cause of contamination of the resulting product in the preparation of a highly pure rare earth metal and thus interfere with the high purification of the rare earth metals.

As a means for solving the problems associated with the foregoing di-(2-ethylhexyl)phosphoric acid, there have been proposed a variety of extractants which have a low extraction capacity and make the back extraction easy. Examples of such extractants include a branched chain alkylphosphoric acid ester represented by the following general formula:

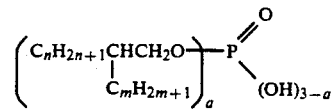

as disclosed in J.P. KOKAI No. Sho 54-112723 and mono 2-ethylhexyl 2-ethylhexylphosphonate as disclosed in J.P. KOKAI No. Sho 54-93672.

However, these compounds have a low distribution factor for the phase of the extraction medium with respect to the ions of the rare earth metals as compared with di-(2-ethylhexyl)phosphoric acid. Thus, these compounds make the back extraction easy, but they have an extraction rate lower than that for di-(2-ethylhexyl)phosphoric acid in the pH region at which the extraction of the rare earth metals is usually performed. For this reason, these compounds suffer from another problem in that the quality of these compounds as the extractant is inferior to that of di-(2-ethylhexyl)phosphoric acid (see Hydrometallurgy, 1989, 22, p. 121).

SUMMARY OF THE INVENTION

Accordingly, the object of the present invention is to provide an extractant for rare earth metals which exhibits high extractability for rare earth metals under the conditions for extracting the ions of the rare earth metals and which makes the back extraction easy and a method for extracting the same.

This and other objects of the present invention will be more apparent from the following description and Examples.

The present invention has been completed on the basis of the following findings that the compounds represented by the following general formulae (I) to (v) are effective as extractants for the rare earth metals, that when an extraction medium containing at least one of the compounds as an extractant is brought into contact with an acidic aqueous solution containing ions of rare earth metals, the rate of extraction of the rare earth metal ions attained is high, that when the rare earth metal ions transferred to the extraction medium is subjected to back extraction, the distribution factor for the phase of the extraction medium is very low at a high acid concentration and thus the extractant shows excellent back extractability and that it shows a high difference between the extractabilities for the light rare earth metals which are abundantly present in the crust of the earth and for medium and heavy rare earth metals and has an excellent power for separation of these from one another.

According to an aspect of the present invention, there is provided an extractant for rare earth metals which comprises a compound represented by the following general formulae (I) to (V):

(wherein $R^1$ and $R^2$ may be the same or different and each represents a cyclohexyl group carrying alkyl groups having 1 to 12 carbon atoms, provided that these alkyl groups are not present on the 2- and 6-positions of the cyclohexyl group; and X represents a hydrogen atom or a monovalent or bivalent metal ion or an ammonium ion);

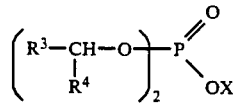

(wherein $R^3$ represents a linear alkyl group having 4 to 16 carbon atoms; $R^4$ represents a linear alkyl group having 1 to 6 carbon atoms; and X is the same as that defined above);

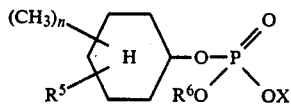

(wherein $R^5$ represents an isopropyl group; $R^6$ represents a linear alkyl group having 8 to 22 carbon atoms; n is an integer ranging from 1 to 3; and X is the same as that defined above);

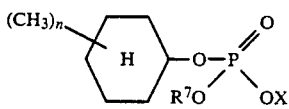

(wherein $R^7$ represents a branched alkyl group having 4 to 10 carbon atoms and X and n are the same as those defined above); and

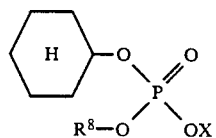

(wherein $R^8$ represents a branched alkyl group having 10 to 20 carbon atoms and X is the same as that defined above).

According to another aspect of the present invention, there is provided a method for extracting rare earth metals wich makes use of the foregoing extractants.

DESCRIPTION OF THE PREFERRED EMBODIMENTS

Typical examples of the compounds of Formula (I) are di-(3methylcyclohexyl)phosphoric acid, di-(4-propylcyclohexyl)phosphoric acid, di-(3-pentylcyclohexyl)phosphoric acid, di-(4-heptylcyclohexyl) phosphoric acid, di-(3, 4-diethylcyclohexyl) phosphoric acid, di-(3, 4dibutylcyclohexyl) phosphoric acid, di-(3, 4, 5-trimethylcyclohexyl) phosphoric acid, di-(3, 4, 5-triethylcyclohexyl) phosphoric acid, di-(3-methyl-4-butylcyclohexyl) phosphoric acid, di-(3-methyl-4-hexylcyclohexyl) phosphoric acid, di-(3-ethyl-4-propylcyclohexyl) phosphoric acid, di-(3-ethyl-4-pentylcyclohexyl) phosphoric acid, di(3-propyl-4-butylcyclohexyl) phosphoric acid, di-(3-propyl-4pentylcyclohexyl)phosphoric acid, di-(3, 5-dimethyl-4-ethylcyclohexyl) phosphoric acid and di-(3, 5-diethyl-4-butylcyclohexyl) phosphoric acid.

In addition, typical examples of the compounds of Formula (II) are di-1-ethylpenthylphosphoric-acid, di-1-methylhexylphosphoric acid, di-1-ethylhexylphosphoric acid, di-1-methylheptylphosphoric acid, di-1-ethylheptylphosphoric acid, di-1-methyloctylphosphoric acid, di-1- o ethyloctylphosphoric acid, di-1-methylnonylphosphoric acid, di-1propylnonylphosphoric acid, di-1-butyldecylphosphoric acid, di-1propyldecylphosphoric acid and di-1-butylpentylphosphoric acid.

Typical examples of the compounds of Formula (III) include docosyl-(2-isopropyl-5-methylcyclohexyl) phosphoric acid, dodecyl-(2- o isopropyl-5-methylcyclohexyl) phosphate, tetradecyl-(2-isopropyl-5methylcyclohexyl)phosphoric acid and octadecyl-(2-isopropyl-5methylcyclohexyl) phosphoric acid.

Typical examples of the compounds of Formula (Iv) include 2-ethylhexyl-2-methylcyclohexylphosphoric acid, 1-methylheptyl-2-methylcyclohexylphosphoric acid, 2-ethylbutyl-2-methylcyclohexylphosphoric acid, 2-ethylpentyl-2-methylcyclohexylphosphoric acid, 2-ethyloctyl-2-methylcyclohexylphosphoric acid, 1-methyloctyl-2, 4-dimethylcyclohexylphosphoric acid, 2-methylhexyl-2, 4-dimethylcyclohex ylphosphoric acid, 1 methylpentyl-3, 4, 5-trimethylcyclohexylphosphoric acid, 2-ethylheptyl-3, 4, 5-trimethylcyclohexylphosphoric acid and 2-ethyloctyl-3, 4, 5-trimethylcyclohexylphosphoric acid.

Furthermore, typical examples of the compounds of Formula (V) are 2-hexyloctyl-cyclohexylphosphoric acid, 2-pentylnonylcyclohexylphosphoric acid, 2-butyldecyl-cyclohexylphosphoric acid, 2-hexyldecyl-cyclohexylphosphoric acid, isostearyl-cyclohexylphosphoric acid, 2-octyldecyl-cyclohexylphosphoric acid, 2-heptylundecylcyclohexylphosphoric acid, 2-hexyldodecyl-cyclohexylphosphoric acid, 2-pentyltridecylcyclohexylphosphoric acid, 2-heptyltridecylcyclohexylphosphoric acid, 2-propylheptyl-cyclohexylphosphoric acid, [2-(3-methylbutyl)-7-methyloctyl ]-cyclohexylphosphoric acid and [2-(1-methylbutyl)-5-methyloctyl]-cyclohexylphosphoric acid.

The foregoing compounds of Formulae (I) to (V) may also be used in combination.

According to a further aspect of the present invention, there is also provided an extractant which simultaneously comprises compounds represented by the following general formulae (VI) and (VII):

(wherein $R^{11}$ represents a cyclohexyl group, a 2-methylcyclohexyl group or a 2-isopropyl-5-methylcyclohexyl group and X represents a hydrogen atom, a monovalent or bivalent metal ion or an ammonium ion); and

(wherein $R^{12}$ represents a branched alkyl group having 10 to 22 carbon atoms when in the compound of Formula (VI), $R^{11}$ is a cyclohexyl group, a linear or branched alkyl group having 4 to 8 carbon atoms when $R^{11}$ is 2-methylcyclohexyl group, or a linear alkyl group having 4 to 8 carbon atoms when $R^{11}$ is 2-isopropyl-5-methylcyclohexyl group; and X is the same as that defined above).

Typical examples of the compounds of Formula (VII) include di-2hexyldecylphosphoric acid, di- [2-(3-methylbutyl)-7-methyloctyl]phosphoric acid, di- [2-(3- methylhexyl)-7-methyldecyl ]phosphoric acid and di-[2-(1, 3, 3-trimethylbutyl)-(5, 7, 7-trimethyloctyl) ]phosphoric acid when the compound of Formula (VI) is dicyclohexylphosphoric acid; dioctylphosphoric acid, dibutylphosphoric acid and di-1methylheptylphosphoric acid when the compound of Formula (VI) is di(2-methylcyclohexyl)phosphoric acid; or dioctylphosphoric acid and dibutylphosphoric acid when the compound of Formula (VI) is di-(2-isopropyl-5-methylcyclohexyl) phosphoric acid.

When the compounds of Formulae (VI) and (VII) are used in combination, the amounts thereof are appropriately selected depending on the kinds of the compounds chosen, but best extraction properties would be anticipated when they are used in combination in a molar ratio, the compound of Formula (VI)/the compound of Formula (VII), ranging from 3:2 to 2:3.

The method for extracting a rare earth metal according to the present invention comprises the step of bringing an acidic aqueous solution containing ions of a rare earth metal into contact with an extraction medium containing the foregoing extractant to thus transfer the rare earth metal ions to the extraction medium.

The acidic aqueous solution which is to be brought into contact with the extraction medium may be any aqueous solutions so long as rare earth metal ions can be dissolved therein and specific examples thereof include aqueous solutions obtained by dissolving naturally occurring ores such as monazite and zenotime or concentrated rare earth metals which are extracted from these ores and then concentrated in a mineral acid such as nitric acid, hydrochloric acid or sulfuric acid. The aqueous-solution preferably has a pH value ranging from 0.05 to 5 and more preferably 0.5 to 2.

The rare earth metal ions concentration of the acidic aqueous solution is not limited to a specific range, but preferably ranges from 10 to 500 g/l expressed in terms of the amount of the rare earth metal oxide ($R_2O_3$). Moreover, the acid concentration of the solution ranges from 0.01 to 2 N, in particular 0.05 to 1 N.

The extraction medium may comprise the foregoing extractant alone, but is preferably those diluted with an organic solvent from the viewpoint of simplifying the extraction operations. Examples of such organic solvents used include petroleum cuts such as kerosene; aliphatic hydrocarbons such as hexane and octane; and aromatic hydrocarbons such as benzene and toluene; as well as halogenated hydrocarbons, ethers and alcohols, which may be used alone or in combination. The foregoing extractant is preferably diluted to a concentration thereof ranging from 0.01 to 2 mole/l.

When the extraction medium is brought into contact with an acidic aqueous solution containing the foregoing rare earth metal ions to carry out the extraction operation, the extraction temperature is not restricted to a specific range, but in general ranges from 10° to 50° C. and preferably 15° to 40° C. In addition, the pH value during the extraction operation may variously be selected and the pH adjustment may be performed by adding an acid or an alkali to the acidic aqueous solution so that the selected pH value is ensured. Examples of such alkalis preferably include those having an ammonium ion, an alkali metal ion or an alkaline earth metal ion. In this case, precipitates such as hydroxides are possibly formed through the addition of an alkali, it is preferred to select, as the extractant, the compounds represented by the general formulae (I) to (VII) in which X is an ammonium ion, an alkali metal ion or an alkaline earth metal ion.

In the extraction operation of the present invention, the liquid-liquid contact may be performed using any liquid-liquid contact apparatus, but it is preferable to select a method in which an extraction medium is countercurrently brought into contact with an acidic aqueous solution containing rare earth metal ions to be extracted using a multi-stage liquid-liquid contact apparatus. In this respect, the ratio of the amount of the extraction medium to that of the acidic aqueous solution is appropriately selected depending on various factors such as the concentration of the extractant and that of the rare earth metal ions to be extracted.

After the extraction, the phase of the extraction medium is separated from the acidic auqeous solution by an appropriate means such as still standing or centrifugation in the usual manner. The rare earth metal ions can be removed from the extraction medium which is separated from the acidic aqueous solution and contains the extracted rare earth metal ions by bringing the extraction medium into contact with an aqueous solution of an inorganic acid to perform the back extraction of the rare earth metal ions into the aqueous solution to thus recover the same. In this case, hydrochloric acid is used as such an inorganic acid, but other inorganic acids such as nitric acid and sulfuric acid may also be employed. The concentration of these inorganic acids is appropriately chosen depending on various factors such as the kind and concentration of the rare earth metal to be extracted.

The extractant of the present invention not only exhibits high extractability for rare earth metal ions but also facilitate the back extraction of the rare earth metal ions therefrom. In particular, the extractant has a great difference between the extractabilities for light rare earth metals which are abundantly present in the crust of the earth and for medium and heavy rare earth metals and has an excellent power for separation of these from one another. For this reason, according to the extraction method of the present invention, the rare earth metal ions can be extracted and separated in high efficiency.

The present invention will hereinafter be explained in more detail with reference to the following Examples and Comparative Examples, but the present invention is by no means limited to these specific Examples.

EXAMPLE 1

In this Example, Dy, Sm and La were used as the rare earth metals. There was prepared a 0.1N hydrochloric acid solution containing 0.05 mole/l each of these rare earth metals and the resulting solution was mixed with a kerosene solution containing 0.5 mole/l of di-(4-methylcyclohexyl)phosphoric acid at a volume ratio of 1:1 and then the mixture was shaken at 25° C. for one hour in order to perform extraction. The distribution factors of these metals observed after the extraction are listed in the following Table 1 and the selectivity ratios of Dy and Sm to La are summarized in Table 2 given below. The distribution factor is herein defined to be the ratio of the amount of a specific metal present in the organic phase to the amount thereof remaining in the auqeous phase. On the other hand, the selectivity ratio can be expressed in terms of the ratio of the distribution factor of a metal to that for another metal.

To examine the back extractability of the rare earth metals from the solution containing di-(4-methylcyclohexyl)phosphoric acid, experiments were carried out while the hydrochloric acid concentration in the aqueous phase was increased up to 1N and the distribution factor of each metal was determined to estimate the degree of reduction in the distribution factor accompanied by the increase of the acid concentration. The results thus obtained are likewise listed in the following Table 1.

TABLE 1

| Distribution Factor | 0.1N-HCl | 1.0N-HCl |
|---|---|---|
| DDy | 49.0 | 0.11 |
| DSm | 11.68 | 0.01 |
| DLa | 0.10 | 0.00 |

TABLE 2

| Selectivity Ratio | |
|---|---|
| SDy/La | 306 |
| SSm/La | 72 |

The results listed in Tables 1 and 2 clearly indicate that di-(4-methylcyclohexyl)phosphoric acid has high extractability and the ability of mutual separation of rare earth metals. The distribution factors of the rare earth metals for the organic phase were very low under the condition of a high acid concentration. This also indicates that this extractant is also excellent in the back extractability.

COMPARATIVE EXAMPLE 1

The same experiment carried out in Example 1 was performed except that 2-ethylhexyl 2-ethylhexylphosphonate was substituted for the extractant used in Example 1. The distribution factor of each metal and the selectivity ratios thus obtained are listed in the following Tables 3 and 4 respectively.

TABLE 3

| Distribution Factor | 0.1N-HCl | 1.0N-HCl |
|---|---|---|
| DDy | 2.42 | 0.05 |
| DSm | 0.36 | 0.01 |
| DLa | 0.02 | 0.00 |

TABLE 4

| Selectivity Ratio | |
|---|---|
| SDy/La | 118 |
| SSm/La | 17 |

The results listed in Tables 3 and 4 indicate that 2-ethylhexyl 2-ethylhexylphosphonate has a distribution factor lower than that of di-(4-methylcyclohexyl) phosphate and hence a poor ability of extracting the rare earth metals.

COMPARATIVE EXAMPLE 2

The same experiment as that in Example 1 was performed using di-(2-ethylhexyl) phosphate as an extractant and thus the results listed in the following Tables 5 and 6 were obtained.

TABLE 5

| Distribution Factor | 0.1N-HCl | 1.0N-HCl |
|---|---|---|
| DDy | 54.50 | 1.41 |
| DSm | 4.13 | 0.10 |
| DLa | 0.57 | 0.02 |

TABLE 6

| Selectivity Ratio | |
|---|---|
| SDy/La | 115 |
| SSm/La | 7.28 |

As seen from the results listed in these Tables, di-(2-ethylhexyl) phosphoric acid showed a high extraction rate when it was used as 0.1N hydrochloric acid solution, but the distribution factors of Dy and Sm were also high for 1 N hydrochloric acid solution (DDy=1.41 and rate of extraction=57% for Dy; and DSm=0.1 and rate of extraction=10% for Sm). Thus, it is clear that the back extraction is rather difficult when di-(2-ethylhexyl) phosphate was used as an extractant as compared with the compound of the present invention.

EXAMPLES 2 TO 5

The same procedures used in Example 1 were repeated except that di-(3-methylcyclohexyl) phosphoric acid (Example 2), 3-methylcyclohexyl-4-methylcyclohexylphosphoric acid (Example 3), di-(4-ethylcyclohexyl) phosphoric acid (Example 4) and di-(4-dodecylcyclohexyl)phosphoric acid (Example 5) were substituted for the extractant used in Example 1 to likewise determine the distribution factor of Dy (DDy) and the selectivity ratio of Dy to La (SDy/La=DDy/DLa). The results thus obtained are listed in the following Table 7.

COMPARATIVE EXAMPLES 3 TO 6

The same procedures used in Example 1 were repeated except that dicyclohexylphosphoric acid (Comparative Example 3), di-(2-isopropyl-4-methylcyclohexyl) phosphoric acid (Comparative Example 4), di-[4-(2-heptylundecyl)cyclohexyl] phosphoric acid (Comparative Example 5) and di-(2-heptylundecyl)phosphoric acid (Comparative Example 6) were substituted for the extractant used in Example 1 to likewise determine the distribution factor of Dy(DDy) and the selectivity ratio of Dy to La (SDy/La=DDy/DLa). The results thus obtained are also listed in the following Table 7.

TABLE 7

| Example No. | | 0.1N HCl | 1.0N HCl |
|---|---|---|---|
| 2 | DDy | 10.1 | 0.12 |
| | SDy/La | 91.8 | — |
| 3 | DDy | 30.0 | 0.08 |
| | SDy/La | 214 | — |
| 4 | DDy | 41.2 | 0.11 |
| | SDy/La | 343 | — |
| 5 | DDy | 11.0 | 0.08 |
| | SDy/La | 220 | — |
| 3* | DDy | 65.7 | 2.3 |
| | SDy/La | 9 | — |
| 4* | DDy | 0.17 | 0.03 |
| | SDy/La | 15 | — |
| 5* | DDy | 1.1 | 0.01 |
| | SDy/La | 12.2 | — |
| 6* | DDy | 1.9 | 0.04 |
| | SDy/La | 7.6 | — |

*Comparative Example

EXAMPLE 6

The same procedures used in Example 1 were repeated except that di-(1-methylheptyl)phosphoric acid was substituted for the extractant used in Example 1. The results obtained are summarized in the following Tables 8 and 9.

TABLE 8

| Distribution Factor | 0.1N-HCl | 1.0N-HCl |
|---|---|---|
| DDy | 42.5 | 0.11 |
| DSm | 1.43 | 0.05 |
| DLa | 0.18 | 0.04 |

TABLE 9

| Selectivity Ratio | |
|---|---|
| SDy/La (DDy/DLa) | 236.1 |
| SSm/La (DSm/DLa) | 7.9 |

EXAMPLES 7 TO 10

The same procedures used in Example 1 were repeated except that di-(1-ethylhexyl)phosphoric acid (Example 7), di-(1-methylnonyl) phosphoric acid (Example 8), di-(1-methylpentyl) phosphoric acid (Example 9) and di-(1-hexylhexadecyl) phosphoric acid (Example 10) were substituted for the extractant used in Example 1 to likewise determine DDy and SDy/La. The results thus obtained are listed in the following Table 10.

COMPARATIVE EXAMPLES 7 TO 9

The same procedures used in Example 1 were repeated except that dioctylphosphoric acid (Comparative Example 7), di-(2-heptylundecyl) phosphoric acid (Comparative Example 8) and di-(2-heptylhexadecyl) phosphoric acid (Comparative Example 9) were substituted for the extractant used in Example 1 to likewise determine DDy and SDy/La. The results thus obtained are also listed in the following Table 10.

TABLE 10

| Example No. | | 0.1N HCl | 1.0N HCl |
|---|---|---|---|
| 7 | DDy | 15.0 | 0.02 |
|   | SDy/La | 136.4 | — |
| 8 | DDy | 35 | 0.05 |
|   | SDy/La | 209.1 | — |
| 9 | DDy | 44 | 0.11 |
|   | SDy/La | 244.4 | — |
| 10 | DDy | 10.1 | 0.03 |
|    | SDy/La | 200 | — |
| 7* | DDy | 99 | 10.1 |
|    | SDy/La | 82.5 | — |
| 8* | DDy | 1.5 | 0.11 |
|    | SDy/La | 30 | — |
| 9* | DDy | 1.9 | 0.04 |
|    | SDy/La | 7.6 | — |

*Comparative Example

EXAMPLE 11

The same procedures used in Example 1 were repeated except that 2-ethylhexyl-2-methylcyclohexylphosphoric acid was substituted for the extractant used in Example 1. The results obtained are summarized in the following Tables 11 and 12.

TABLE 11

| Distribution Factor | 0.1N-HCl | 1.0N-HCl |
|---|---|---|
| DDy | 34.7 | 0.11 |
| DSm | 1.52 | 0 |
| DLa | 0.12 | 0 |

TABLE 12

| Selectivity Ratio | |
|---|---|
| SDy/La (DDy/DLa) | 289 |
| SSm/La (DSm/DLa) | 12.7 |

EXAMPLES 12 AND 13

The same Procedures used in Example 1 were repeated except that 1-methylheptyl-2-methylcyclohexylphosphoric acid (Example 12) and dodecyl-(2-isopropyl-5-methylcyclohexyl)phosphoric acid (Example 13) were substituted for the extractant used in Example 1 to likewise determine DDy and SDy/La. The results thus obtained are listed in the following Table 13.

COMPARATIVE EXAMPLES 10 AND 11

The same procedures used in Example 1 were repeated except that 2-ethylhexyl-(2-isopropyl-5-methylcyclohexyl)phosphoric acid (Comparative Example 10) and 1-octyl-2-butyldecylphosphoric acid (Comparative Example 11) were substituted for the extractant used in Example 1 to likewise determine DDy and SDy/La. The results thus obtained are also listed in the following Table 13.

TABLE 13

| Example No. | | 0.1N HCl | 1.0N HCl |
|---|---|---|---|
| 12 | DDy | 32.3 | 0.11 |
|    | SDy/La | 230.7 | — |
| 13 | DDy | 49.0 | 0.05 |
|    | SDy/La | 245 | — |
| 10* | DDy | 2.7 | 0.05 |
|     | SDy/La | 19.3 | — |
| 11* | DDy | 39.0 | 1.22 |
|     | SDy/La | 40.6 | — |

*Comparative Example

EXAMPLE 14

The same procedures used in Example 1 were repeated except that 2-butyldecyl-cyclohexylphosphoric acid was substituted for the extractant used in Example 1. The results obtained are summarized in the following Tables 14 and 15.

TABLE 14

| Distribution Factor | 0.1N-HCl | 1.0N-HCl |
|---|---|---|
| DDy | 39.0 | 0.11 |
| DSm | 1.5 | 0.02 |
| DLa | 0.11 | 0.01 |

TABLE 15

| Selectivity Ratio | |
|---|---|
| SDy/La (DDy/DLa) | 354.5 |
| SSm/La (DSm/DLa) | 13.6 |

EXAMPLES 15 TO 18

The same procedures used in Example 1 were repeated except that 2-hexyloctyl-cyclohexyl phosphoric acid (Example 15), [2-(3-methylbutyl)-7-methyloctyl] cyclohexylphosphoric acid (Example 16). 2-heptylundecyl-cyclohexylphosphoric acid (Example 17) and 2-octyldodecyl-cyclohexylphosphoric acid (Example 18) were substituted for the extractant used in Example 1 to likewise determine DDy and SDy/La. The results thus obtained are listed in the following Table

COMPARATIVE EXAMPLES 12 TO 14

The same procedures used in Example 1 were repeated except that 2-ethylhexyl-(2-isopropyl-5-methylcyclohexyl)phosphoric acid (Comparative Example 12), 1-octyl-2-butyldecylphosphoric acid (Comparative Example 13) and 2-decyltridecyl-cyclohexylphosphoric acid (Comparative Example 14) were substituted for the extractant used in Example 1 to likewise determine DDy and SDy/La. The results thus obtained are also listed in the following Table 16.

TABLE 16

| Example No. | | 0.1N HCl | 1.0N HCl |
| --- | --- | --- | --- |
| 15 | DDy | 30.0 | 0.11 |
|    | SDy/La | 272 | — |
| 16 | DDy | 15.6 | 0.05 |
|    | SDy/La | 141 | — |
| 17 | DDy | 10.1 | 0.11 |
|    | SDy/La | 74.1 | — |
| 18 | DDy | 9.0 | 0.05 |
|    | SDy/La | 9.0 | — |
| 12* | DDy | 2.7 | 0.05 |
|     | SDy/La | 19.3 | — |
| 13* | DDy | 39.0 | 1.22 |
|     | SDy/La | 40.6 | — |
| 14* | DDy | 2.3 | 0.11 |
|     | SDy/La | 1.91 | — |

*Comparative Example

The results listed in Table 16 indicate that all of the extractants of the present invention exhibit high Dy-extracting properties and ability of being easily back extracted.

EXAMPLES 19

In this Example, Dy, Sm and La were used as the rare earth metals. There was prepared a 0.1 N hydrochloric acid solution containing 0.05 mole/l each of these rare earth metals and the resulting solution was mixed with a kerosene solution containing 0.5 mole/l of a 1:1 (molar ratio) mixture of dicyclohexylphosphoric acid and di-(2-heptylundecyl)phosphoric acid at a volume ratio of 1:1 and then the mixture was shaken at 25° C. for one hour in order to perform extraction. The distribution factors of these metals observed after the extraction are listed in the following Table 17 and the selectivity ratios of Dy and Sm to La are summarized in Table 18 given below. The distribution factor is herein defined to be the ratio of the amount of a specific metal present in the organic phase to the amount thereof remaining in the aqueous phase and, on the other hand, the selectivity ratio can be expressed in terms of the ratio of the distribution factor of a metal to that for another metal, as defined in Example 1.

To examine the back extractability of these rare earth metals from the solution containing the combination of dicyclohexyl phosphoric acid and di-(2-heptylundecyl)-phosphoric acid, experiments were carried out while the hydrochloric acid concentration in the aqueous phase was increased up to 1 N and the distribution factor of each metal was determined to estimate the degree of reduction in the distribution factor accompanied by the increase of the acid concentration. The results thus obtained are likewise listed in the following Table 17.

TABLE 17

| Distribution Factor | 0.1N-HCl | 1.0N-HCl |
| --- | --- | --- |
| DDy | 65.7 | 0.11 |
| DSm | 7.3 | 0.05 |
| DLa | 0.43 | 0.02 |

TABLE 18

| Selectivity Ratio | |
| --- | --- |
| SDy/La | 152 |
| SSm/La | 17.0 |

The results listed in Tables 17 and 18 clearly indicate that the extractant comprising a combination of dicyclohexylphosphoric acid and di-(2-heptylundecyl)phosphoric acid has high extractability of rare earth metals and the ability of mutual separation of the rare earth metals. The distribution factors of the rare earth metals for the organic phase were very low under the condition of a high acid concentration. This also indicates that this extractant is also excellent in the back extractability.

EXAMPLES 20 TO 22

The same procedures used in Example 19 were repeated except that a 1:1 (molar ratio) combination of dicyclohexylphosphoric acid and di-[(2-(3-methylbutyl)-7 methyloctyl) phosphoric acid (Example 20), a 1:1 (molar ratio) combination of di-(2-methylcyclohexyl) phosphoric acid and dioctylphosphoric acid (Example 21) and a 1:1 (molar ratio) combination of di-(2 isopropyl-5-methylcyclohexyl) phosphoric acid and dibutylphosphoric acid (Example 22) were substituted for the extractant used in Example 19 to likewise determine the distribution factor of Dy (DDy) and the selectivity ratio of Dy to La (SDy/La=DDy/DLa). The results thus obtained are listed in the following Table 19.

COMPARATIVE EXAMPLES 15 TO 17

The same procedures used in Example 16 were repeated except that a 1:1 (molar ratio) combination of dicyclohexylphosphoric acid and di-(2-ethylhexyl)-phosphoric acid (Comparative Example 15), a 1:1 (molar ratio) combination of di-(2-isopropyl-5-methylcyclohexyl) phosphoric acid and di-(2-ethylhexyl)phosphoric acid (Comparative Example 16) and a 1:1 (molar ratio) combination of dioctylphosphoric acid and di-(heptylundecyl)phosphoric acid (Comparative Example 17) were substituted for the extractant used in Example 19 to likewise determine the distribution factor of Dy (DDy) and the selectivity ratio of Dy to La (SDy/La=DDy/DLa). The results thus obtained are also listed in the following Table 19.

TABLE 19

| Example No. | | 0.1N HCl | 1.0N HCl |
| --- | --- | --- | --- |
| 20 | DDy | 49.1 | 0.08 |
|    | SDy/La | 116 | — |
| 21 | DDy | 37.4 | 0.11 |
|    | SDy/La | 340 | — |
| 22 | DDy | 19.0 | 0.08 |
|    | SDy/La | 211 | — |
| 15* | DDy | 49 | 1.38 |
|     | SDy/La | 116 | — |
| 16* | DDy | 2.45 | 0.17 |
|     | SDy/La | 13.9 | — |
| 17* | DDy | 99 | 2.3 |
|     | SDy/La | 103 | — |

*Comparative Example

The foregoing results indicate that all of the extractants of the present invention have a high extractability Dy and an ability of being easily back-extracted.

What is claimed is:

1. A method for extracting rare earth metals comprising the step of bringing an acidic aqueous solution containing ions of rare earth metals into contact with an extraction medium to transfer the rare earth metal ions to the extraction medium, said extraction medium containing a compound represented by the following general formulae:

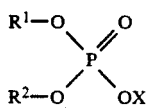

wherein $R^1$ and $R^2$ may be the same or different and each represents a cyclohexyl group carrying alkyl groups having 1 to 12 carbon atoms, provided that these alkyl groups are not present on the 2- and 6-positions of the cyclohexyl group; and X represents a hydrogen atom or a monovalent or bivalent metal ion or an ammonium ion;

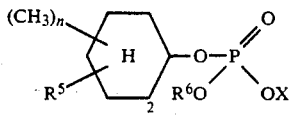

wherein $R^5$ represents an isopropyl group; $R^6$ represents a linear alkyl group having 8 to 22 carbon atoms; n is an integer ranging from 1 to 3; and X is the same as that defined above;

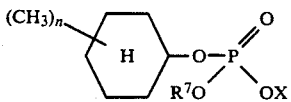

wherein $R^7$ represents a branched alkyl group having 4 to 10 carbon atoms and X and n are the same as those defined above;

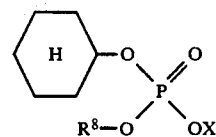

wherein $R^8$ represents a branched alkyl group having 10 to 20 carbon atoms and X is the same as that defined above;

or represented by a combination of compounds represented by the following formulae:

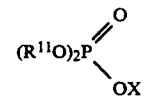

wherein $R^{11}$ represents a cyclohexyl group, a 2-methylcyclohexyl group or a 2-isopropyl-5-methylcyclohexyl group and X represents a hydrogen atom, a monovalent or bivalent metal ion or an ammonium ion; and

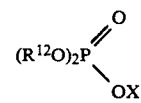

wherein $R^{12}$ represents a branched alkyl group having 10 to 22 carbon atoms when $R^{11}$ is a cyclohexyl group, a linear or branched alkyl group having 4 to 8 carbon atoms when $R^{11}$ is a 2-methylcyclohexyl group, or a linear alkyl group having 4 to 8 carbon atoms when $R^{11}$ is a 2-isopropyl-5methylcyclohexyl group; and X is the same as that defined above.

2. The method of claim 1 wherein the aqueous solution has a pH value ranging from 0.05 to 5.

3. The method of claim 1 wherein the rare earth metal ions concentration of the acidic aqueous solution ranges from 10 to 500 g/l expressed in terms of the amount of a rare earth metal oxide ($R_2O_3$).

4. The method of claim 1 wherein the acid concentration of the solution ranges from 0.01 to 2N.

5. The method of claim 1 wherein the extraction medium comprises the extractant diluted with an organic solvent to a concentration ranging from 0.01 to 2 mole/l.

6. The method of claim 5 wherein the organic solvent is a member selected from the group consisting of aliphatic hydrocarbons, aromatic hydrocarbons, halogenated hydrocarbons, ethers and alcohols and mixtures thereof.

7. The method of claim 1 wherein the extraction temperature ranges from 15° to 40° C.

* * * * *